United States Patent [19]
Lane et al.

[11] Patent Number: 5,611,198
[45] Date of Patent: Mar. 18, 1997

[54] SERIES COMBINATION CATALYTIC CONVERTER

[75] Inventors: William H. Lane, Chillicothe; Daniel J. Learned; Randy N. Peterson, both of Peoria; Aaron L. Smith; Scott T. White, both of East Peoria, all of Ill.

[73] Assignee: Caterpillar Inc., Peoria, Ill.

[21] Appl. No.: 291,213

[22] Filed: Aug. 16, 1994

[51] Int. Cl.$^6$ ................................................. F01N 3/28
[52] U.S. Cl. ........................... 60/299; 60/301; 60/303; 422/170; 422/180; 423/213.7
[58] Field of Search ..................... 60/299, 301, 303; 422/170, 180, 182; 423/212, 213.5, 213.7

[56] References Cited

U.S. PATENT DOCUMENTS

| | | | |
|---|---|---|---|
| 3,597,165 | 8/1971 | Keith | 60/299 |
| 3,825,654 | 7/1974 | Kobylinski | 423/213.7 |
| 3,896,616 | 7/1975 | Keith | 60/301 |
| 4,003,976 | 1/1977 | Komatsu et al. | 423/213.5 |
| 4,235,846 | 11/1980 | Abthoff | 60/299 |
| 4,248,833 | 2/1987 | Aoyama | 60/299 |
| 5,085,050 | 2/1992 | Katoh | 60/288 |
| 5,106,588 | 4/1992 | Sims | 60/299 |
| 5,155,994 | 10/1992 | Muraki et al. | 60/275 |
| 5,174,111 | 12/1992 | Nomura et al. | 60/285 |
| 5,189,876 | 3/1993 | Hirota et al. | 60/286 |
| 5,201,802 | 4/1993 | Hirota et al. | 60/276 |
| 5,209,061 | 5/1993 | Takeshima | 60/278 |
| 5,233,830 | 8/1993 | Takeshima et al. | 60/278 |
| 5,285,640 | 2/1994 | Olivo | 60/301 |
| 5,313,702 | 5/1994 | Katoh | 60/301 |
| 5,349,816 | 9/1994 | Sanbayashi | 60/277 |
| 5,397,545 | 3/1995 | Balling | 422/170 |
| 5,399,324 | 3/1995 | Subramanian | 423/213.7 |

*Primary Examiner*—Douglas Hart
*Attorney, Agent, or Firm*—Robert J. Hampsch; Dennis C. Skarvan

[57] ABSTRACT

The present invention is particularly applicable to lean burn engines that produce exhaust containing insufficient amounts of unburned hydrocarbons to satisfactorily reduce NOx emissions without undermining engine performance. In the exhaust purification system, ethanol or another suitable hydrocarbon is injected into the exhaust stream at an appropriate location between the engine and the catalytic converter. A deNOx catalytic converter is positioned within the exhaust downstream from the ethanol injection point. The combination engine application, ethanol injection and suitable deNOx catalyst combine to reduce NOx to satisfactory levels without producing significant amounts of undesirable secondary nitrogen containing compounds. An oxidation catalytic converter is positioned in the exhaust downstream from the deNOx catalytic converter. The oxidation catalyst serves to convert any remaining unburned hydrocarbons into carbon dioxide and water. At the same time, only small amounts of secondary nitrogen compounds are converted back into NOx compounds upon passage through the oxidation catalyst. The end result being an overall reduction in both HC and NOx compounds particularly for lean burn engines to satisfactory levels.

19 Claims, 4 Drawing Sheets

Fig_2_

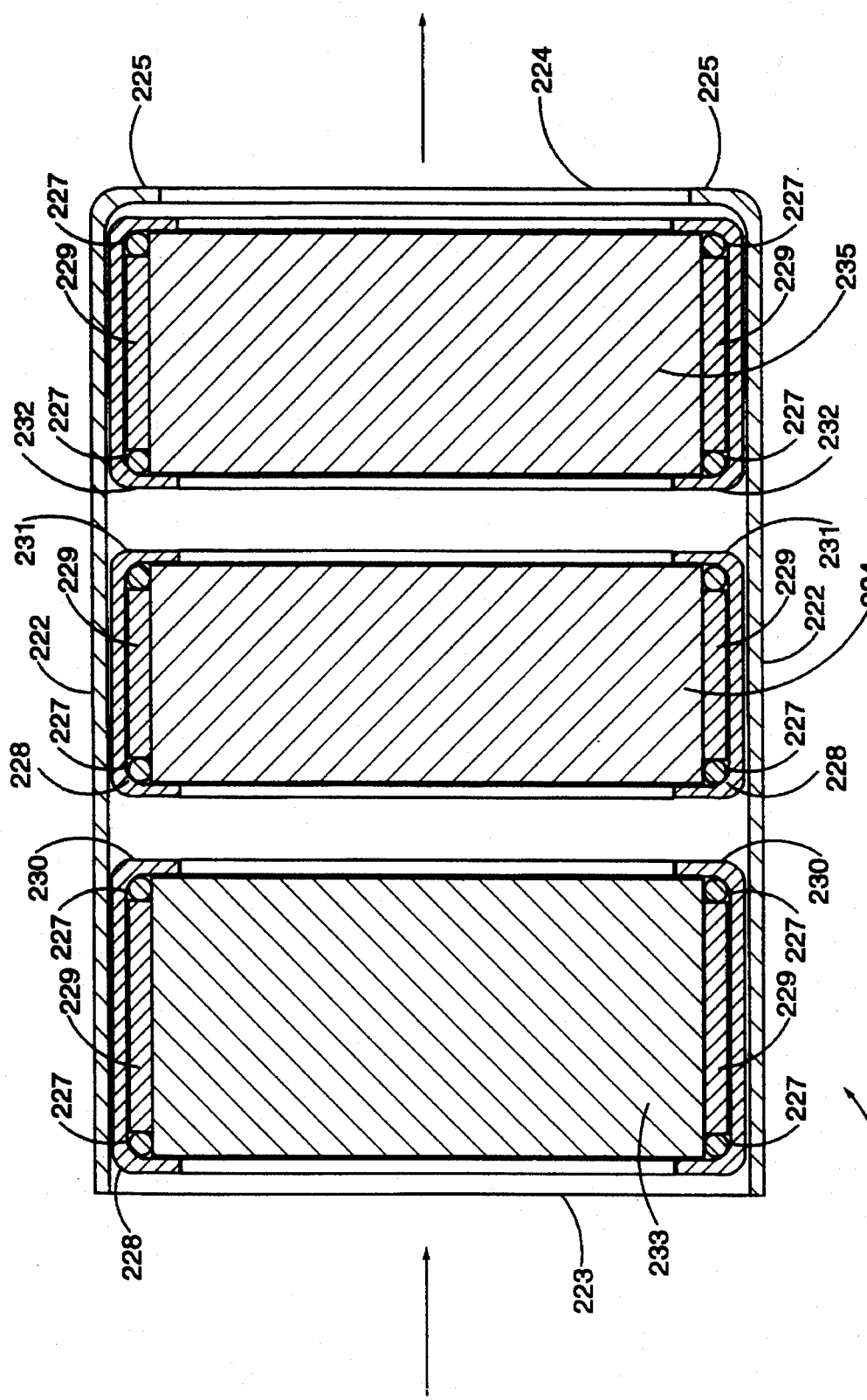

SERIES COMBINATION CATALYTIC CONVERTER

TECHNICAL FIELD

The present invention relates generally to catalytic converters, and in particular to a catalytic converter containing a series combination deNOx catalyst and oxidation catalyst.

BACKGROUND OF THE INVENTION

Many current technology NOx reducing catalysts for application in the exhaust of a lean burn engine—including diesel and certain spark igniting engines—require hydrocarbon (HC) species to effectively reduce the NOx concentration in the exhaust. The amount of HC required to reduce the NOx content of the exhaust varies with the selected converter and engine combination. Some engine applications will not have enough HC in the exhaust to remove the required amount of NOx. Accordingly, one aspect of the present invention relates to the injection of HC into the exhaust in order to reduce the concentration of NOx in the exhaust. Certain inventive techniques for adding HC into the exhaust are described in co-pending applications.

With the addition of HC into the exhaust of certain engine/catalyst packages, the NOx emissions are effectively reduced, but the levels of HC and CO in the exhaust are significantly increased over the non-catalyst levels. In another aspect of the present invention, the additional HC and CO are brought back to acceptable levels by the addition of an oxidation catalyst downstream of a deNOx catalyst. This arrangement has been found to effectively reduce the NOx emissions from the engine without increasing CO and HC emissions above acceptable levels.

Certain aspects of the present invention are particularly applicable to catalytic converters for relatively large diesel engines. Because ceramic catalyst substrates cannot readily be extruded in diameters greater than about 12 inches, catalytic converters for relatively large diesel engines must necessarily include a plurality of ceramic catalyst substrates arranged in parallel in order to adequately treat the exhaust without introducing unacceptable back pressures on the engine. In extreme cases, such as diesel engines for large generators, the catalytic converter can require fourteen or more 10 inch diameter catalyst substrates arranged in parallel within the exhaust passageway. These compound catalytic converters present new problems not previously encountered in relation to relatively small engines. Thus, in still another aspect of the present invention, certain inventive structures are described to overcome the special problems that arise in relation to relatively large diesel engines.

SUMMARY OF THE INVENTION

One embodiment of the present invention comprises a series combination catalytic converter for purifying combustion exhaust. A tubular housing having an inlet and an outlet houses first and second substrates arranged in series. The first substrate is coated with a deNOx catalyst, and the second substrate is coated with an oxidation catalyst. A matting material at least partially fills the annular space between the inner surface of the tubular housing and the substrates. End rings are mounted in the tubular housing contiguous to the matting material and serve to protect the same from the damaging effects of the exhaust. Finally, the outlet of the tubular housing includes a retaining lip that projects inward a sufficient distance that the first and second substrates are unable to escape from the tubular housing through the outlet.

In another embodiment of the present invention, a catalytic converter comprises an exhaust passageway containing a plurality of first substrates coated with a deNOx catalyst and a plurality of second substrates coated with an oxidation catalyst. Each of the first substrates are contained within an individual tubular housing and the housings are mounted in parallel within the exhaust passageway. Likewise, the second substrates are contained within individual tubular housings that are also mounted in parallel within the exhaust passageway. The second substrates having the oxidation catalyst are located downstream of the first substrates having the deNOx catalyst. Finally, some means is mounted within the exhaust passageway for preventing exhaust from bypassing the catalyst substrates.

Still another embodiment of the present invention can be described as an improvement to an exhaust purification system for an internal combustion engine in which hydrocarbons are injected into the exhaust stream downstream from the engine. The improvement comprises positioning a deNOx catalytic converter in the exhaust stream, and positioning an oxidation catalytic converter in the exhaust stream downstream of the deNOx catalytic converter.

One object of the present invention is to purify combustion exhaust.

Another object of the present invention is to provide an improved catalytic converter for relatively large diesel engines.

BRIEF DESCRIPTION OF THE DRAWINGS

FIG. 4 is a side sectioned view of a series combination catalytic converter according to still another embodiment of the present invention.

DETAILED DESCRIPTION OF PREFERRED EMBODIMENTS

Figure 1:
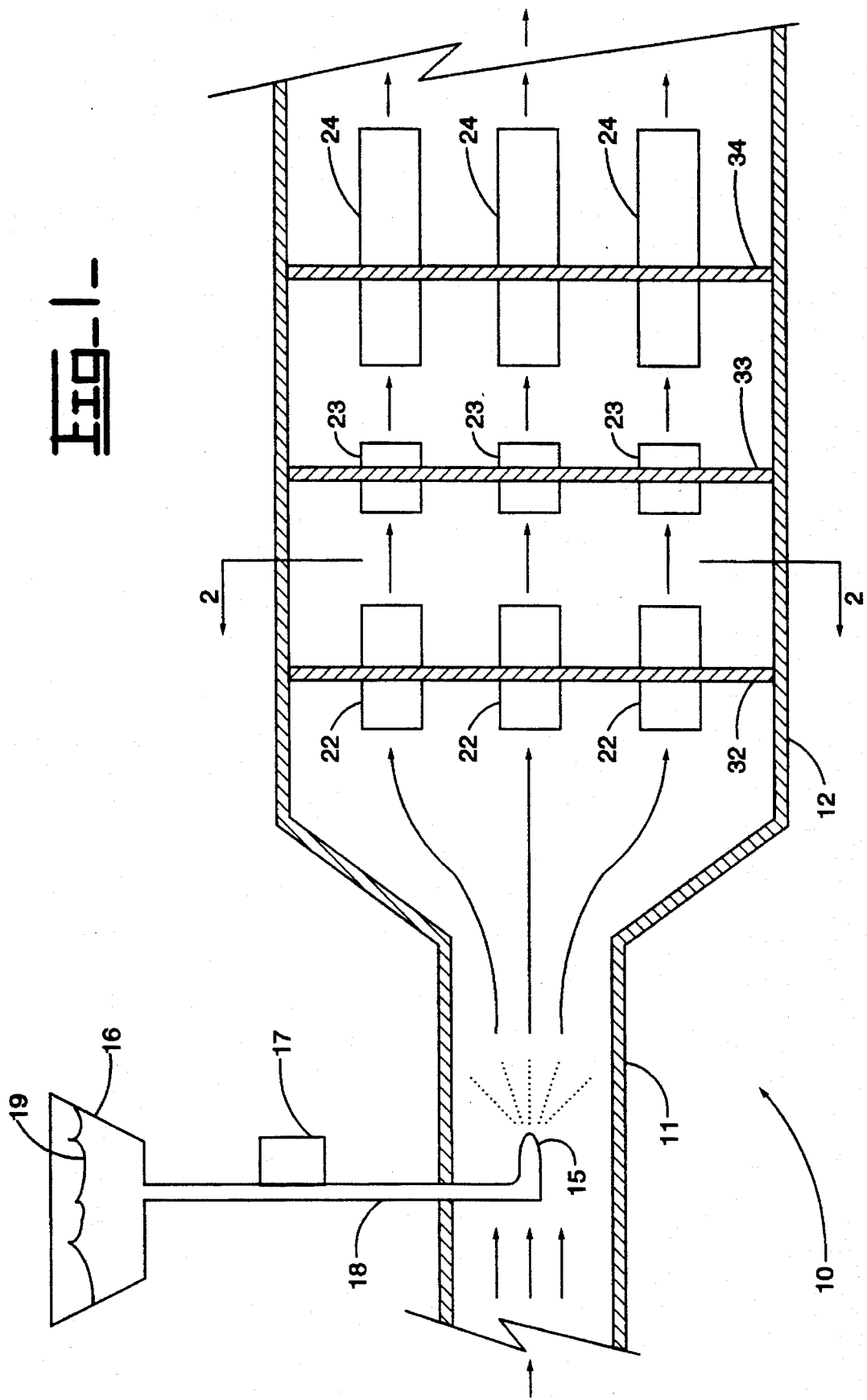
FIG. 1 is a side sectioned schematic view of an exhaust gas purification system according to one embodiment of the present invention.

Referring now to FIG. 1, an exhaust gas purification system 10 includes an exhaust passageway 11 from a combustion source, such as an engine. Exhaust enters system 10 through exhaust passageway 11 and then flows into catalytic converter housing 12 which opens downstream (not shown) into the atmosphere. Of course, the system could also include a muffler either upstream or downstream from catalytic converter 12. Hydrocarbons 19 are injected into the exhaust flow via a nozzle 15. HC 19, which is preferably ethanol, is stored within a tank 16 and pumped via supply conduit 18 through pump 17 to nozzle 15, which is located within exhaust passageway 11. Although the present system is believed to have a wide range of applications, it is particularly applicable to lean burn engines whose exhaust contains excess oxygen and insufficient HC to reduce NOx content of the exhaust to satisfactory levels. For instance, one such engine is a Caterpillar 3516 diesel engine. In any event, HC 19 can be something other than the diesel fuel used by the engine itself.

Figure 2:
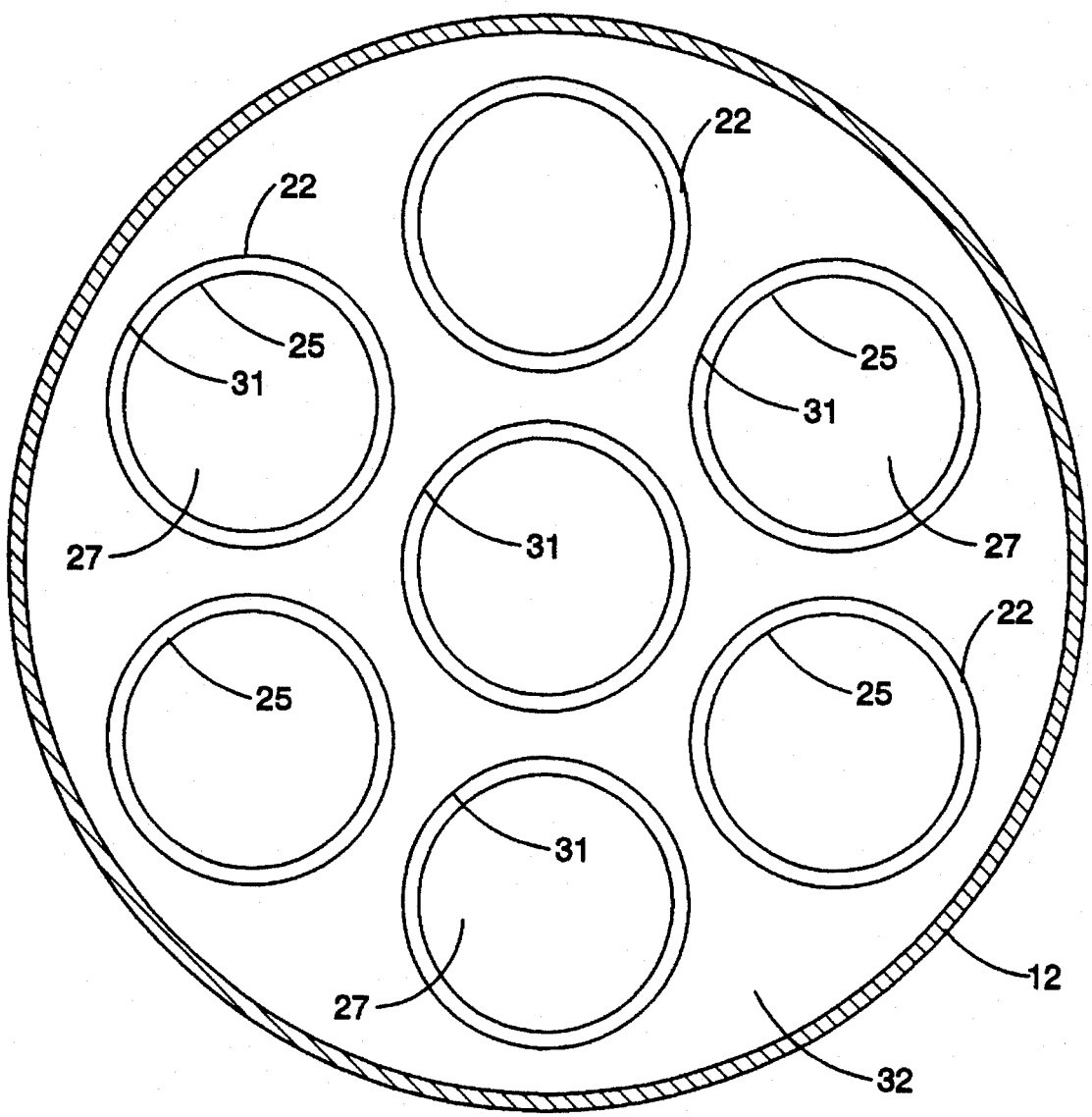
FIG. 2 is a rear sectioned view of the catalytic converter shown in FIG. 1 taken along section lines 2—2.

In this embodiment, three dividing walls 32, 33 and 34 divide catalytic converter housing 12 into separate sub chambers. Each of the dividing walls has a plurality of openings 31 (FIG. 2). In the case of a relatively large diesel engine, catalytic converter housing 12 can be as much as 36 inches or more in diameter. Consequently, a plurality, in this case 7, catalytic converter substrates 27 (FIG. 2) are required in order to create a sufficient cross sectional flow area to accommodate the large mass flow of exhaust from large diesel engines. Each substrate 27 is mounted within an individual tubular housing 22. It has been found that the hexagonal distribution of the tubular housings 22 in dividing wall 32 wastes a minimum of space while maintaining a large effect catalyst cross sectional area. The dividing wall 32 provides both a mounting structure for tubular housings 22 and prevents any exhaust from bypassing the catalytic converter substrates 27. Substrates 27 can be coated with one of several deNOx catalyst known in the art but is preferably coated with one of the following catalysts: Zeolite such as ZSM5 or a precious metal based catalyst or combo of both. After passing through tubular housings 22, approximately 80% or more of the NOx compounds in the exhaust stream have been reduced. However, as a consequence of the chemical reactions taking place by the addition of HC into the exhaust and the reaction with the deNOx catalyst of substrate 27, other undesirable nitrogen containing compounds, such as ammonia, may be created.

After dividing wall 32, the exhaust passes through a plurality of tubular housings 23 that are arranged in a dividing wall 33 in a manner similar to that of dividing wall 32 previously described. Each one of the tubular housings 23 contains a selective catalyst reducer that is particularly suited for reacting with and reducing the undesirable nitrogen compounds present in the exhaust. After passing through tubular housings 23 as much as 90% of the nitrogen containing compounds have been reduced to non-toxic gases. While most of the undesirable nitrogen containing compounds have been removed from the exhaust upon reaching this point in the exhaust stream, unacceptable levels of HC are present since only a portion of the injected HC has been consumed in reducing the NOx compounds.

The third dividing wall 34 holds a plurality of tubular housings 24 containing ceramic substrates coated with an oxidation catalyst in order to aid in converting the remaining HCs in the exhaust to carbon dioxide and water. Since most of the undesirable nitrogen containing compounds have been reduced before reaching the oxidation catalyst contained in tubular housings 24, only small portions of the exhaust are converted back into undesirable NOx compounds upon passing through the oxidation catalyst. Thus, apart from the remaining HC, most of the exhaust is unaffected by passage through the oxidation catalyst contained within tubular housings 24. Depending upon the effective cross sectional catalyst area required, tubular housings 24 are arranged in a hexagonal pattern similar to that illustrated in FIG. 2 in relation to tubular housings 22 and dividing wall 32. Upon exiting tubular housings 24, the exhaust contains acceptable levels of both NOx and HC.

Figure 3:
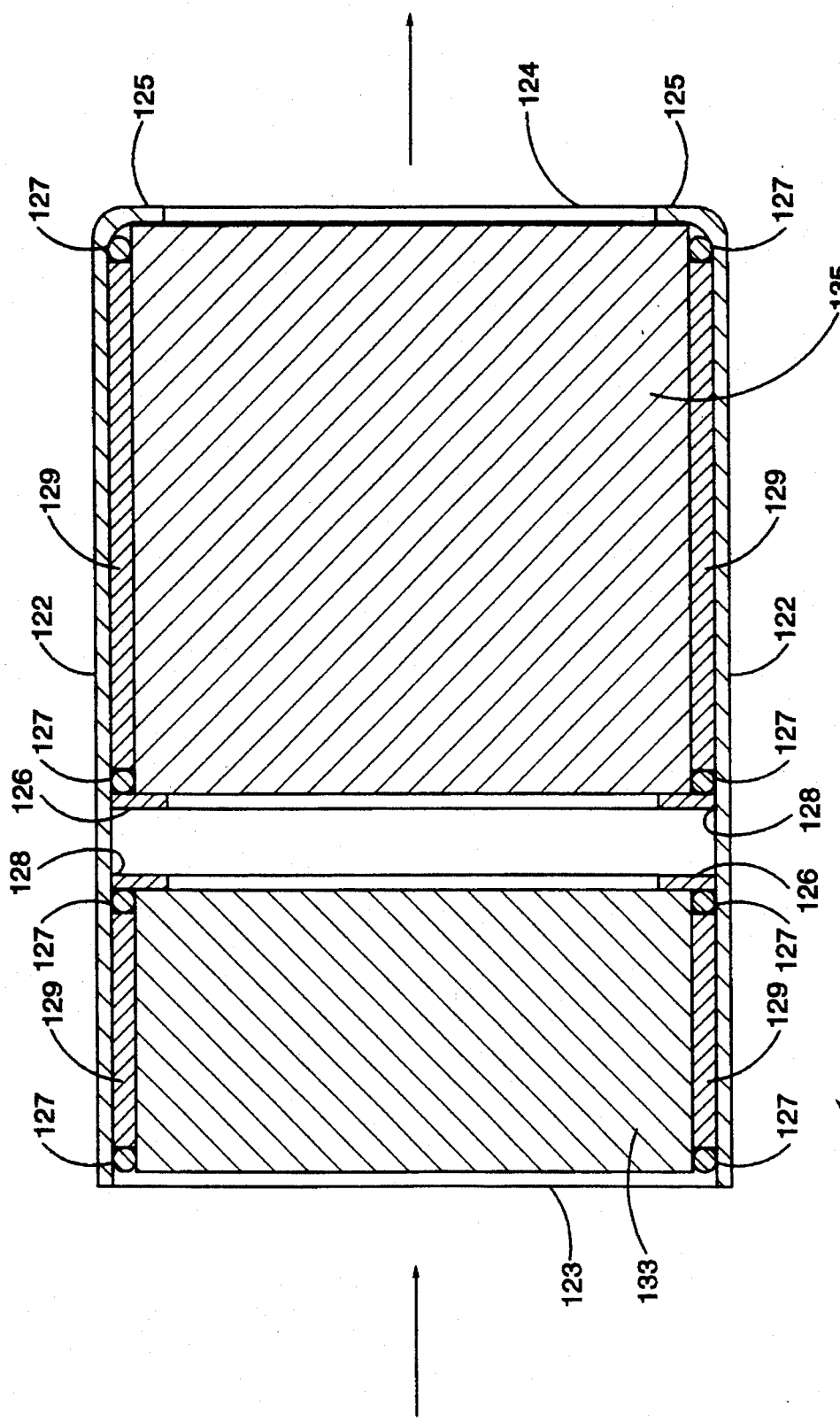
FIG. 3 is a side sectioned view of a series combination catalytic converter according to another embodiment of the present invention.

Referring now to FIG. 2, the catalytic substrates are shown as having a circular cross section but could equally well have other cross sectional shapes, such as squares, or even a mixture of shapes and/or sizes. Because of the pressure differential across the dividing walls 32, 33 and 34, each of the tubular housings 22, 23 and 24 include an inwardly turned annular retaining lip 25 that prevents the ceramic substrate within the tubular housing from escaping downstream. For example, tubular housings 22 include a retaining lip 25 that projects radially inward a distance on the order of 2–5 millimeters beyond the inner surface of the housing so that the effective diameter of the exit from each housing is smaller than the diameter of the individual ceramic substrates mounted therein. It is important to note that FIGS. 1 and 2 illustrate an exhaust gas purification system in which the different catalytic substrates are mounted in separate tubular housings. FIGS. 3 and 4 show additional embodiments of the present invention in which two or more different catalyst substrates are mounted in series within an individual tubular housing.

FIG. 3 shows a series combination catalytic converter 110 in which a ceramic substrate 133 coated with a deNOx catalyst is mounted within a tubular housing 122 upstream from a second ceramic substrate 135 coated with an oxidation catalyst. When used in relation to relatively large diesel engines, a plurality of tubular housings 122 are mounted in parallel in the exhaust stream preferably similar to the hexagonal mounting pattern illustrated in FIG. 2 in relation to the earlier embodiment. Exhaust enters tubular housing 122 at inlet 123, passes through deNOx catalyst substrate 133, passes through oxidation catalyst substrate 135 and then exits at outlet 124. Housing 122 includes an inwardly turned retaining lip 125 that projects inward a sufficient distance to prevent the catalyst substrates from being pushed through outlet 124 due to the pressure differential across the device when positioned in an exhaust stream. As discussed earlier, tubular housing 122 is preferably cylindrical in shape and substrates 133 and 135 have a circular cross section and whatever length is necessary to obtain sufficient contact between the exhaust and the respective catalyst.

A pair of retaining rings 126 are mounted within tubular housing 122 via a peripheral weld 128. Dividing rings 126 keep the respective catalyst substrates 133 and 135 separated from one another. A matting material 129, such as mat containing vermiculite, is positioned between the outer surface of the individual substrates and the inner surface of tubular housing 122. Matting material 129 expands under heat to further act to hold the individual substrates in place and prevent any leakage around the individual catalytic substrates. End rings 127, which are preferably made from stainless steel wire mesh, are positioned at each end of matting 129. The end rings serve to shield the matting material 129 from the corrosive effects of the exhaust flow. Tubular housing 122 is preferably made from stainless steel on the order of 0.045–0.055 inches thick. Retaining lip 125 is formed by a bend in one end of the housing. The curvature of the bend serves as a guide when mounting the housing within a dividing wall as discussed with regard to the first embodiment.

This embodiment of the invention is most applicable to those applications in which the deNOx substrate 133 is sufficient to fully reduce NOx compounds without the necessity of a secondary catalyst devoted to the reduction of nitrogen compounds. After passing through deNOx substrate 133, the exhaust has satisfactory levels of NOx reduction but retains unburned HC. In this particular application, only minor amounts of secondary nitrogen compounds remain after passage through the deNOx substrate; thus, only a small portion of the exhaust is converted back into undesirable NOx compounds after passage through the oxidation catalytic substrate 135. After emerging from the oxidation catalytic substrate, the exhaust has acceptable levels of both NOx and HC. Thus, the specific order of the deNOx catalyst upstream from the oxidation catalyst, combined with the injection of HC into the exhaust, achieves over-all reductions of both NOx and HC to acceptable levels without undermining engine performance to a significant extent.

FIG. 4 shows a series combination catalytic converter 210 according to still another embodiment of the present invention in which three different catalytic substrates 233, 234 and 235 are mounted in series within an individual tubular housing 222. This embodiment also differs from the embodiment described with respect to FIG. 3 in that the inner structure includes mounting each of the catalytic substrates in its own sub-can 230, 231 and 232, respectively. Nevertheless, like the earlier embodiment, tubular housing 222 is formed from thin stainless steel and is formed on the outlet end 224 with an annular retaining lip 225 that prevents the individual sub-cans from escaping through the outlet. Also like the earlier embodiment, the curvature of the bend which creates retaining lip 225 is useful as a guide when mounting converter 210 in an opening having a diameter very close to that of housing 222. Each of the sub-cans 230, 231 and 232 are held within tubular housing 222 by a peripheral seam weld at corners 228.

In this embodiment, catalytic substrates 233, 234 and 235 could be similar to the series of catalysts encountered with respect to the embodiment described with regard to the FIG. 1 embodiment. In other words, substrate 233 would be coated with a typical deNOx catalyst, such as combination precious metal and zeolite catalyst. Substrate 234 would be coated with a catalyst appropriate to target secondary undesirable nitrogen compounds existing in the exhaust after exiting substrate 233. After emerging from substrate 234, the exhaust contains very low levels of NOx compounds and even less undesirable secondary nitrogen compounds which would otherwise become NOx compounds after proceeding through an oxidation catalyst. Substrate 35 is coated with an oxidation catalyst in order to promote the conversion of any existing HC and CO into carbon dioxide and water. Only small amounts of the exhaust are turned back into undesirable NOx compounds after passing through oxidation catalyst substrate 235. Upon exiting converter 210 at outlet 224, the exhaust has acceptable levels of both HC and NOx.

Sub-cans 230, 231 and 232 are preferably made from relatively thin stainless steel that is rolled on both ends to create an annular retaining lip that traps the individual ceramic substrates 233, 234 and 235 within the sub-cans. A matting material 229, as described earlier, is mounted between the inner surface of each sub-can and the outer surface of each substrate. The edges of the individual strips of matting 229 are shielded from the corrosive effects of the exhaust by end rings 227. Each of the sub-cans is fixed within tubular housing 22 via a peripheral seam weld at annular corners 228.

Lab testing on a very early NOx catalyst sample with oxidation converters has shown that the oxidation catalysts are very effective in removing the excess HC and CO from the exhaust. The orientation of the converter combinations is critical for acceptable performance. In these applications, the deNOx converter must be upstream of the oxidation converter. The following lab data shows that the inclusion of an oxidation catalyst is necessary to have acceptable HC and CO emissions in certain applications with a deNOx converter.

Emissions Comparison for Combustion Exhaust

| Emissions, g/hphr | Untreated Exhaust | Exhaust, HC Added | HC Added w/DeNOx | HC Added w/DeNOx + Oxicat |
|---|---|---|---|---|
| HC | .07 | 6.69 | 1.96 | .11 |
| NOx | 7.34 | 7.40 | 1.06 | 2.70 |
| CO | .76 | .76 | 3.95 | .15 |

It being understood that only the preferred embodiments have been shown and described and many other different variations come within the contemplated scope of the present invention. For instance, with slight structural simplifications, metallic substrates coated with appropriate catalysts could be substituted for the ceramic substrates described above. In any event, the above embodiments are merely examples of the present invention and the full legal scope of the invention is defined solely with respect to the claims set forth below.

We claim:

1. In an exhaust purification system for an internal combustion engine in which hydrocarbons are injected into the exhaust stream downstream of the engine, the improvement comprising:

a deNOx catalytic converter positioned in the exhaust stream;

an oxidation catalytic converter positioned in the exhaust stream downstream of said deNOx catalytic converter; and a nitrogen compound reducing catalytic converter having substrates coated with a catalyst that promotes reduction of nitrogen containing compounds present in the exhaust downstream of said deNOx catalytic converter, said nitrogen compound reducing catalytic converter located between said deNOx catalytic converter and said oxidation catalytic converter.

2. The improved exhaust purification system of claim 1, wherein the hydrocarbons injected into the exhaust stream is different from the fuel combusted within the engine.

3. The improved exhaust purification system of claim 1, wherein the hydrocarbons injected into the exhaust stream consist primarily of ethanol.

4. A catalytic converter comprising:

an exhaust passageway;

a plurality of first substrates coated with a deNOx catalyst, each of said first substrates mounted within a first set of tubular housings within said exhaust passageway;

a plurality of second substrates coated with an oxidation catalyst, each of said second substrates mounted within a second set of tubular housings within said exhaust passageway, said second substrates located downstream of said first substrates;

one or more walls for preventing exhaust from bypassing said first substrates and said second substrates, each of said walls having a plurality of openings and mounted across said exhaust passageway, wherein one tubular housing of said first set is mounted in each of said plurality of openings in one of said walls; and wherein one tubular housing of said second set is also mounted in each of said plurality of openings in one of said walls.

5. The catalytic converter of claim 4 wherein one of said first substrates contained within said first set of tubular housings and one of said second substrates contained within said second set of tubular housings are further contained within an outer tubular housing mounted in said openings in said walls.

6. The catalytic converter of claim 4 wherein said first set of tubular housings and said second set of tubular housings are a common set of housings.

7. The catalytic converter of claim 4 further comprising a plurality of third substrates coated with a catalyst that promotes reduction of nitrogen containing compounds present in the exhaust downstream of said first substrates, said third substrates are located between said first substrates and said second substrates.

8. The catalytic converter of claim 7 wherein each of said third substrates is mounted within said first set of tubular housings downstream of said first substrates.

9. The catalytic converter of claim 7 wherein each of said third substrates is mounted within said second set of tubular housings upstream of said second substrates.

10. The catalytic converter of claim 7 wherein each of said third substrates is contained within a third set of tubular housings mounted within said exhaust passageway between said first set of tubular housings and said second set of tubular housings.

11. The catalytic converter of claim 4 further comprising means for injecting hydrocarbons into the exhaust passageway, said injected hydrocarbons being different from the fuel contained in the exhaust.

12. A catalytic converter comprising:

an exhaust passageway;

a plurality of first substrates coated with a deNOx catalyst, each of said first substrates contained within a first set of tubular housings mounted within said exhaust passageway;

a plurality of second substrates coated with an oxidation catalyst, each of said second substrates contained within a second set of tubular housings mounted within said exhaust passageway, said second substrates located downstream of said first substrates;

a plurality of third substrates coated with a catalyst that promotes reduction of nitrogen containing compounds present in the exhaust downstream of said first substrates, said third substrates located between said first substrates and said second substrates; and means, mounted within said exhaust passageway, for preventing exhaust from bypassing said first substrates and said second substrates.

13. The catalytic converter of claim 12 wherein each of said third substrates is contained within a third set of tubular housings mounted within said exhaust passageway between said first and second set of tubular housings.

14. The catalytic converter of claim 13 wherein one of said first substrates contained within said first set of tubular housings and one of said second substrates contained within said second set of tubular housings and one of said third substrates contained within said third set of tubular housings are further contained within an outer tubular housing.

15. The catalytic converter of claim 12 wherein each of said third substrates is mounted within said first set of tubular housings downstream of said first substrates.

16. The catalytic converter of claim 12 wherein each of said third substrates is mounted within said second set of tubular housings upstream of said second substrates.

17. The catalytic converter of claim 12, wherein said preventing means includes one or more walls mounted across said exhaust passageway and having a plurality of openings adapted for receiving said tubular housings.

18. The catalytic converter of claim 12 further comprising means for injecting hydrocarbons into the exhaust passageway, said injected hydrocarbons being different from the fuel contained in the exhaust.

19. A catalytic converter comprising:

an exhaust passageway;

a plurality of first substrates coated with a deNOx catalyst, each of said first substrates contained within a tubular housing mounted within said exhaust passageway;

a plurality of second substrates coated with an oxidation catalyst, each of said second substrates contained within said tubular housing mounted within said exhaust passageway, said second substrates located downstream of said first substrates;

a plurality of third substrates coated with a catalyst that promotes reduction of nitrogen containing compounds present in the exhaust downstream of said first substrates, said third substrates contained within said tubular housing mounted within said exhaust passageway and located between said first substrates and said second substrates; and a wall mounted across said exhaust passageway, having a plurality of openings, said wall adapted for preventing exhaust from bypassing said first substrates and said second substrates and wherein one of said tubular housings is mounted in one of said openings in said wall.

* * * * *